United States Patent [19]

Iwasa et al.

[11] Patent Number: 5,070,290
[45] Date of Patent: Dec. 3, 1991

[54] ALTERNATING CURRENT MOTOR CONTROL SYSTEM WITH EMERGENCY CONTROL RESPONSIVE TO FAILURE OF POWER SUPPLY

[75] Inventors: Masao Iwasa, Chiba; Masayuki Mori, Aichi, both of Japan

[73] Assignee: Otis Elevator Company, Farmington, Conn.

[21] Appl. No.: 314,356

[22] PCT Filed: May 20, 1988

[86] PCT No.: PCT/JP88/00479

§ 371 Date: Mar. 13, 1989

§ 102(e) Date: Mar. 13, 1989

[87] PCT Pub. No.: WO88/09584

PCT Pub. Date: Dec. 1, 1988

[30] Foreign Application Priority Data

May 20, 1987 [JP] Japan .................................. 62-124959

[51] Int. Cl.⁵ .............................................. H02P 3/26
[52] U.S. Cl. ..................................... 318/758; 187/109
[58] Field of Search ............... 187/105, 108, 109, 119, 187/115; 318/758, 759, 762, 798, 806

[56] References Cited

U.S. PATENT DOCUMENTS

| | | | |
|---|---|---|---|
| 3,829,757 | 8/1974 | Frank et al. | 318/722 |
| 4,445,167 | 4/1984 | Okado | 318/811 |
| 4,661,757 | 4/1987 | Hokari et al. | 187/119 |
| 4,678,063 | 7/1987 | Kitaoka et al. | 187/119 |

Primary Examiner—David Smith, Jr.

[57] ABSTRACT

A control system for an alternating current motor, such as an elevator hoisting induction motor, in response to failure of power supply, such as service interruption, phase open and so forth, performs in a first emergency control mode and in a second emergency control mode. In the first emergency control mode operation, dynamic braking is used to decelerate the motor. On the other hand, in the second emergency mode, triggered while the motor is driven in regeneration mode to recirculate regenerated power to decelerate the motor, a mechanical brake is applied. During second emergency control mode operation, power supply condition is monitored to detect failure of the power supply for switching control mode from the second emergency control mode to the first emergency control mode. Switching from the second emergency control mode to the first emergency control mode assures synchronous operation of an inverter and the motor after resumption of power supply to the motor in cases where the power failure is short in duration.

20 Claims, 3 Drawing Sheets

ALTERNATING CURRENT MOTOR CONTROL SYSTEM WITH EMERGENCY CONTROL RESPONSIVE TO FAILURE OF POWER SUPPLY

REFERENCE TO RELATED APPLICATION

This application discloses subject matter which may be disclosed and claimed in co-pending U.S. application Ser. No. 07/196,199, now U.S. Pat. No. 4,902,954, which issued on Feb. 20, 1990.

BACKGROUND OF THE INVENTION

1. Field of the Invention

The present invention relates generally to a control system for an alternating current motor, such as an induction motor. More specifically, the invention relates to a control system including an inverter circuit, for driving an induction motor of an elevator hoist. Further particularly, the invention relates to an inverter circuit for an elevator driving induction motor which assumes an emergency control mode upon power failure, such as service interruption and so forth.

2. Description of the Background Art

When an inverter is employed in a driving system for an elevator, driving power which is variable of voltage and frequency is applied for accelerating and decelerating an induction motor which drives the elevator cage. The amount of driving power to be applied to the induction motor is controlled by pulse width modulation (PWM) and by maintaining the current level to be applied to the inverter constant.

In modern elevator drive systems, particularly the drive systems for large size elevators, high power efficiency has been achieved by recirculating regenerated power to the inverter circuit.

In such elevator drive systems, the inverters are disabled in response to service interruption or phase interruption. Mechanical brakes are then applied for stopping the elevator cage. Since the inverter in such conventional drive systems is not in operation during emergency control operation triggered by service interruptions or phase interruption, the inertia energy of the elevator is absorbed solely by the mechanical brake. As a consequence, the mechanical brake employed in the emergency control of the elevator drive system must be a heavy duty device which is rather bulky.

Especially, in the case of the large size and high speed elevators which are now available, it is difficult to obtain satisfactory braking torque through the use of mechanical brakes. Furthermore, when the induction motor is in a regenerative mode, the regenerated energy cannot be recirculated to the inverter during emergency control initiated by service interruption or phase interruption. In such cases, a difficulty is encountered in absorption of the regenerative energy.

SUMMARY OF THE INVENTION

Therefore, it is an object of the present invention to provide a drive system for an elevator driving induction motor, which can solve the aforementioned drawbacks encountered in the prior art emergency control systems.

Another object of the invention is to provide a drive system for an elevator driving an induction in a regenerative mode motor which can reduce the load on the mechanical brake that stops the elevator and thus can allow the mechanical brake to be made compact.

In the above-mentioned co-pending application, now U.S. Pat. No. 4,902,954, a system was disclosed in which upon detecting a power failure, the control circuit prevents the flow of power through the converter to the fixed frequency AC power source and reduces the current magnitude of the inverter output power to a predetermined minimum limit, enough to maintain a synchronous relationship between the inverter and the motor. When the power failure continues for a predetermined time, an electric resistor is connected between the relatively positive and negative conductors to provide a dynamic braking of the motor. If the power failure occurs during a regenerative condition, an overvoltage detector will produce an indication thereof to start dynamic braking before the predetermined time elapses. But it is possible that even though a power failure has occurred it will be undetected because the control can produce AC onto the grid that appears the same as that normally provided by the AC source.

A further object of the invention is to provide a drive system for a regenerative induction motor which can protect switching elements in an inverter circuit of the drive system from excessive voltage or excessive current from the power source.

In order to accomplish the aforementioned and other objects, a control system for an alternating current motor, such as an induction motor used for elevator hoisting, according to the invention, performs emergency control in response to failure of the power supply, such as in a service interruption, phase disruption and so forth, performs in first emergency control mode and in second emergency control mode. In first emergency control mode operation, a dynamic brake is used for decelerating the motor. On the other hand, the second emergency mode is only triggered while the motor is being driven in regeneration mode to recirculate regenerated power to decelerate the motor. In the second emergency control mode, a mechanical brake is applied. During second emergency control mode operation, the power supply condition is monitored to detect failure of the power supply and switching control mode from the second emergency control mode to the first emergency control mode. Switching of emergency control mode from the second emergency control mode to the first emergency control mode assures synchronous operation of an inverter and the motor after resumption of the motor in case the power failure only occurs for a short period, such as in a temporary service interruption.

According to one aspect of the invention, a control system for an alternating current motor which is selectively driven in either a power mode in which alternating current power is supplied thereto and a regeneration mode in which power is regenerated therein, comprises first means, connected to an alternating power source, for converting alternating current power into direct current power; second means, connected to the first means to receive therefrom the converted direct current power, for converting the direct current power into a controlled frequency and amplitude of alternating current to supply to the alternating current motor; third means, associated with the second means and responsive to one of the levels of current and voltage exceeding a predetermined level in the first means during regeneration mode operation of the induction motor to perform dynamic braking; fourth means associated with the alternating current motor, for applying a mechanical brake; fifth means, incorporated in the first means, for recirculating regenerated power from the alternating current motor operating in the regeneration mode via the second means; and sixth means for controlling the second means to drive the motor at an adjustable speed, the sixth means including a first emergency control means responsive to a power failure for disabling the fifth means to prevent flow of the regenerated power to the power source and reducing the current magnitude of the second means output power to a predetermined minimum limit low enough to maintain a synchronous relationship between the second means and the motor, for making the third means active for dynamically braking the motor when the power failure continues for a predetermined time, and a second emergency control means responsive to one of current level and voltage level in the first means exceeding the predetermined level during regeneration mode operation of the alternating current motor, for activating the fourth means and monitoring power supply condition of the power source for detecting the activity of the fourth means, the second emergency control means activating the first emergency control means when power failure is detected while the fourth means is held inactive and otherwise controlling the fourth means for adjusting braking torque of the mechanical brake for decelerating the motor to stop.

According to another object of the invention, a control system for controlling an induction motor which is selectively driven in a power mode with alternating current power is supplied thereto and a regeneration mode in which power is regenerated therein, comprises a converter connected to a source of AC power for converting the AC power into DC power, an inverter connected through relatively positive and negative conductors to the converter for inverting the DC power into AC output power having adjustable frequency, voltage magnitude and current magnitude to drive the motor, the converter including regeneration means controlled to permit flow of power from the inverter to the power source during regenerative conditions, an electric resistor, a control circuit for controlling the inverter to drive the motor at an adjustable speed, the control circuit including a first emergency control means responsive to a power failure for disabling the fifth means to prevent flow of the regenerated power to the power source and reducing the current magnitude of the second means output power to a predetermined minimum limit low enough to maintain a synchronous relationship between the inverter and the motor, for dynamically braking the motor when the power failure continues for a predetermined first period and a second emergency control means responsive to one of current level and voltage level in the converter in excess of the predetermined levels during regeneration mode operation of the alternating current motor, for activating a mechanical brake for decelerating the motor, the second emergency control means monitoring power supply condition of the power source while the mechanical brake is active, and the second emergency control means activating the first emergency control means when power failure is detected while the mechanical brake is held inactive, and for otherwise controlling braking torque of the mechanical brake for decelerating the motor to stop otherwise.

In the preferred construction, the induction motor control system may further comprise a third detector connected between the power source and the regenerating means for monitoring current level of the regenerated power to produce a second detector signal in response to the monitored current level exceeding a given current value, and a second detector connected between the converter and inverter for monitoring voltage of power supplied from the power source to produce a first detector signal in response to the monitored voltage exceeding a given voltage value, and the second emergency control means of the control circuit is responsive to one of the first and second detector signals to perform emergency control operation. The second emergency control means of the control circuit checks the first and second detector signals for a predetermined second period of time in which the mechanical brake is held inactive.

In the preferred application, the induction motor is used as an elevator cage hoisting motor for driving an elevator cage, and the first and second emergency control means, while in operation, control the induction motor to stop the elevator cage at a predetermined position.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
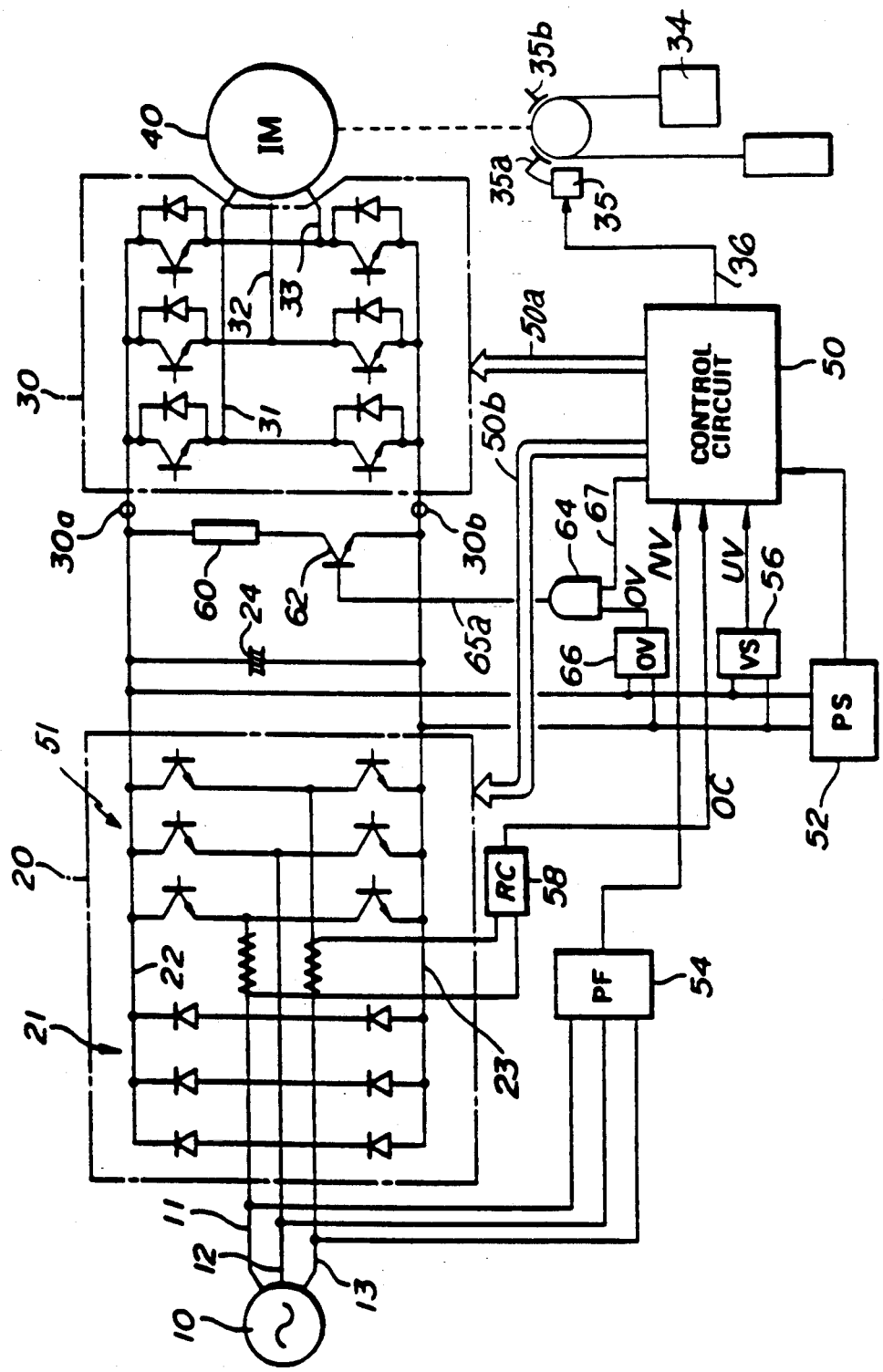
FIG. 1 is a schematic block diagram showing one embodiment of an alternating current motor control apparatus made in accordance with the invention.

With reference now to the drawings, and particularly to FIG. 1, a converter system 20 includes input conductors 11, 12 and 13 for receiving electric power from a suitable three-phase AC power source 10, such as a commercial power source. The input conductors 11, 12 and 13 carry the three-phase AC power to a three-phase power rectifier 21 which is operative to convert AC power to DC power for energizing a DC link shown as the relatively positive conductor 22 and the relatively negative conductor 23. The power rectifier 21 is shown as including a plurality of parallel pairs of series-connected diodes. A capacitor 24 spans the DC link for smoothing the rectified power. The DC power across the smoothing capacitor 24 is applied to respective DC input terminals 30a and 30b of a power inverter 30. The inverter 30 is shown as including a plurality of parallel pairs of series-connected power transistor circuits arranged and controlled to convert the DC input power into three-phase AC output power having adjustable frequency and voltage magnitude. Each of the power transistor circuits has known structure including a power transistor.

Though power transistor circuits are generally known per se to those skilled in the art, a power transistor circuit which has been illustrated in U.S. application Ser. No. 07/488,526 filed Feb. 28, 1990 which is a continuation of U.S. application Ser. No. 07/314,359 (now abandoned) filed Mar. 13, 1989, claiming priority from PCT Application PCT/JP88/00458 filed on May 13, 1988, and from Japanese Utility Model Application No. 62 71248 filed on May 13, 1987, will be applicable for constituting the power inverter 30.

Each of the power transistor circuits has its base or control electrode coupled to a control circuit 50 which supplies the power transistors with cyclic gate pulses to turn on the power transistors in a predetermined sequence and at a desired frequency. The power transistor-based power inverter may be replaced with other types of inverter circuits, such as a thyristor inverter, GTO inverter and so forth. The three-phase AC output is supplied through output conductors 31, 32 and 33 to a three-phase induction motor 40 which is used to drive an elevator passenger cage 34.

The induction motor 40 can be propelled (motoring or power mode) or retarded (braking mode) as desired by appropriately varying the frequency and the amplitude of the excitation that the inverter 30 applies to the induction motor 40. For this purpose, the control circuit 50 regulates and controls the operation of the inverter 30 in programmed response to a plurality of input signals which may comprise a signal representing the desired motor speed and a feedback signal representative of the actual motor speed. The control circuit 50 utilizes a pulse width modulation (PWM) control technique to produce gating pulses so as to periodically switch the respective power transistors of the inverter 30 in accordance with a speed pattern programmed into the control circuit 50.

During the motoring mode operation of the inverter 30, the AC power generated by the inverter is supplied to the induction motor 40 for driving the elevator cage. On the other hand, upon braking of the induction motor 40 for stopping the elevator cage wherein the inverter 30 operates in regeneration mode, regenerated power from the induction motor recirculates through the inverter and is absorbed by a dynamic brake circuit including a regenerated power absorbing resistor 60 and a switching transistor 62. The regenerated power of the induction motor 40 is also absorbed by the smoothing capacitor 24.

The converter system 20 also includes a plurality of parallel pairs of series-connected power transistors arranged and controlled to feed the regenerated current to the AC power source 10. For this purpose, each of the power transistors has its base or controlled electrode coupled to the control circuit 50. These power transistors may be replaced with silicon controlled rectifiers or other switching elements to obtain the same result.

The control circuit 50 operates on regulated DC power supplied from a constant-voltage regulated power source (PS) 52 which is supplied with DC power from the converter system 20. The control circuit 50 receives input from various detection circuits including a power failure detection circuit (PF) 54, a voltage shortage detection circuit (VS) 56 and a regenerated current detection circuit (RC) 58. The power failure detection circuit 54 has three inputs connected to the respective input conductors 11, 12 and 13 for producing a power failure indication signal NV when a power failure such as service interruption, open-phase, or the like occurs. The voltage shortage detection circuit 56 has two inputs connected to the respective positive and negative conductors 22 and 23 for producing a voltage shortage indication signal UV when a voltage drop appears in the AC power source 10 or the inverter system 20. The overcurrent detection circuit 58 is connected to input conductors 11 and 13 for monitoring current level during regeneration mode operation to produce an overcurrent indicative signal OC when regenerated current in excess of a predetermined value is detected. These signals NV, UV and OC are applied to the control circuit 50.

As shown in FIG. 1, the smoothing capacitor 24 is connected in parallel with the dynamic brake circuit including the resistor 60 and the switching transistor 62. The switching transistor 62 has a base or controlled electrode connected to the output of an AND gate 64. The AND gate 64 on a line 65a has an input connected to the control circuit 50 and another input connected to an overvoltage detection circuit (OV) 66. The overvoltage detection circuit 66 has two inputs connected to the positive and negative conductors 22 and 23 for producing an overvoltage indication signal OV in the form of a high-level signal to the AND gate 64 when an overvoltage appears at the output of the converter system 20. It is to be noted, of course, that the switching transistor 62 may be replaced with a silicon controlled rectifier or other switching element.

In response to the power failure indication signal NV or the voltage shortage indication signal UV, the control circuit 50 carries out the following controls. First, the control circuit 50 controls the power transistors of the converter system 20 on a line 50b to interrupt the regenerated current flow to the AC power source 10. This is effective to protect the power transistors from breakage due to excessive current flow caused when a power failure occurs during a regenerative condition. Second, the control circuit 50 controls the inverter 30 on a line 50a to reduce its output current to a predetermined minimum limit low enough to maintain the synchronous relationship between the inverter 30 and the induction motor 40. This is effective to keep the induction motor running while minimizing the DC voltage drop across the conductors 22 and 23 so as to facilitate the resumption of the induction motor operation upon resumption of the power supply after the power failure. Third, the control circuit 50 produces a high-level signal on a line 67 to open the AND gate 64. The output of the AND gate 64 changes to its high level, turning on the power transistor 62 so as to connect the braking resistor 60 cross the capacitor 24 when the overvoltage detection 66 produces an overvoltage indication signal OV. This is effective to protect the power transistors and the capacitor 24 from breakage due to excessive current flow caused after the regenerated current flow is interrupted.

The operation of the invention may be better understood by the following discussion with reference to FIGS. 2A to 2H and 3. It is assumed that a power failure occurs at time $t_0$, as shown in FIG. 2B, during the motoring mode operation where the control circuit 50 controls the inverter 30 to drive the induction motor 40 at a target speed Ns, as shown in FIG. 2A. At time $t_1$, the power failure detection circuit 54 or the voltage shortage detection circuit 56 produces a signal indicative of the power failure to the control circuit 50, as shown in FIG. 2D. In response to this failure indication signal, the control circuit 50 by means of the signal on line 50b turns off the power transistors of the converter system 20 to prevent regenerated current flow to the AC power source 10, as shown in FIG. 2F. The control circuit 50 controls the inverter 30 by means of the signal on line 50b to reduce the output current to the induction motor 40 to a predetermined minimum limit low enough to maintain the synchronous relationship between the inverter 30 and the induction motor 40, as shown in FIG. 2H. At the same time, the control circuit 50 feed, a high-level signal on the line 67 to the AND gate 64.

If necessary, the dynamic brake circuit may be associated with fail-safe system therefor as described in the co-pending. U.S. application Ser. No. 07/305,123 filed on Oct. 24, 1988 claiming priority from PCT Application PCT/JP88/00212 filed on Feb. 26, 1988 and Japanese Utility Model Application No. 62-27786 filed on Feb. 26, 1987. The disclosure of the above-identified co-pending PCT Application will be herein incorporated by reference for the sake of disclosure.

When power supply from the power source is resumed within a relatively short period, e.g., within several tenths of a second, the control circuit 50 controls the AND gate 64 to shut (removing the signal on the line 67) with a low level signal thereto Thus, the switching transistor 62 is turned off to render the dynamic brake circuit non-conductive At the same time, dynamic braking applied to the induction motor 40 is cause to cease. On the other hand, if the power failure continues for a predetermined time $T_D$, for example, several more tenths of a second, the control circuit 50 detects the duration of the power failure exceeding the predetermined time $T_D$ at a time $t_4$, as shown in FIG. 2E, and controls the inverter 30 by means of the signal on line 50a to operate the induction motor 40 for deceleration, as shown in FIG. 2A, while at the same time releasing the current limitation, as-shown in FIG. 2C. Under these circumstances, current will flow from the induction motor 40 through the inverter 30 to charge the capacitor 24, causing an excessive voltage across the conductors 22 and 23. The overvoltage detection circuit 66 detects this excessive voltage and generates the overvoltage indication signal OV. Since the AND gate 64 has been opened, the overvoltage indication signal OV changes the output of the AND gate 64 to its high level, turning on the power transistor 62 to connect the braking resistor 60 across the capacitor 24, at a time $t_2$. Under these conditions, the braking resistor 60 serves to absorb energy generated by dynamic braking so as to decelerate the induction motor 40 and reduce the regenerated current. At a time $t_5$, when the voltage across the conductors 22 and 23 drops below a predetermined level, the overvoltage detection circuit 66 stops generating the overvoltage indication signal OV and turns off the power transistor 62 so as to continue the dynamic braking. Thereafter, a mechanical braking means 35, 35a, 35b is actuated by means of a braking signal on a line 36 which is used to bring the elevator to a stop by means of a signal 36 from the control circuit 50.

It is to be noted that, during the period between time $t_i$ and time $t_4$, the inverter 30 operates in a normal manner except for its output current being at a predetermined minimum limit. Assuming now that the power failure ceases at time $t_3$ which is prior to time $t_4$, as shown by the broken line of FIG. 2B, the power failure indication signal ceases at time $t_3$, as shown by the broken line of FIG. 2D, and thus, the control circuit 50 controls the inverter 30 to return its output current to its initial magnitude, as shown by the broken line of FIG. 2H, and turns on the power transistors of the converter system 20 to permit flow of regenerated current to the AC power source 10, is shown by the broken line of FIG. 2F. In addition, the control circuit 50 holds the AND gate 64 closed to prevent the dynamic braking function of the braking resistor 60, as shown by the broken line of FIG. 2G.

As described previously, the control circuit 50 is responsive to a power failure for stopping the regeneration function and reducing the inverter output current to a predetermined minimum level low enough to maintain a synchronous relationship between the inverter 30 and the induction motor 40. If the power failure ceases within the predetermined time $T_D$, the control circuit 50 returns the inverter 30 to its normal operation mode. Otherwise, the control circuit 50 commands the induction motor 40 to operate in dynamic braking mode. If the power failure occurs during a regenerative condition, the overvoltage detector 66 will produce an overvoltage indication signal to start the dynamic braking operation of the induction motor before the lapse of the time $T_D$ so that the induction motor 40 can be stopped.

When failure of power source 10 occurs while the converter circuit 20 is operating in the regeneration mode, it is possible that the input level at the input conductors 11, 12 and 13 remain will at a normal level because of the presence of regenerated energy. In such case, the power failure detection circuit 54 may fail to detect the power failure. Therefore, the control circuit 50 may maintain normal mode control while the system is operating in regeneration mode. An emergency stop operation is performed in the converter circuit 20 and the inverter circuit 30 when excessive voltage or excessive current is detected, to protect the power transistors in the converter circuit and the inverter circuit. In this emergency stop operation, the induction motor 40 is decelerated to a stop by means of the mechanical brake or combination of the mechanical brake and dynamic brake. This tends to destroy the synchronous relationship between the inverter 30 and the induction motor 40. Therefore, if this is performed as in the prior art, synchronous operation after temporary interruption of service becomes impossible.

Figure 3:
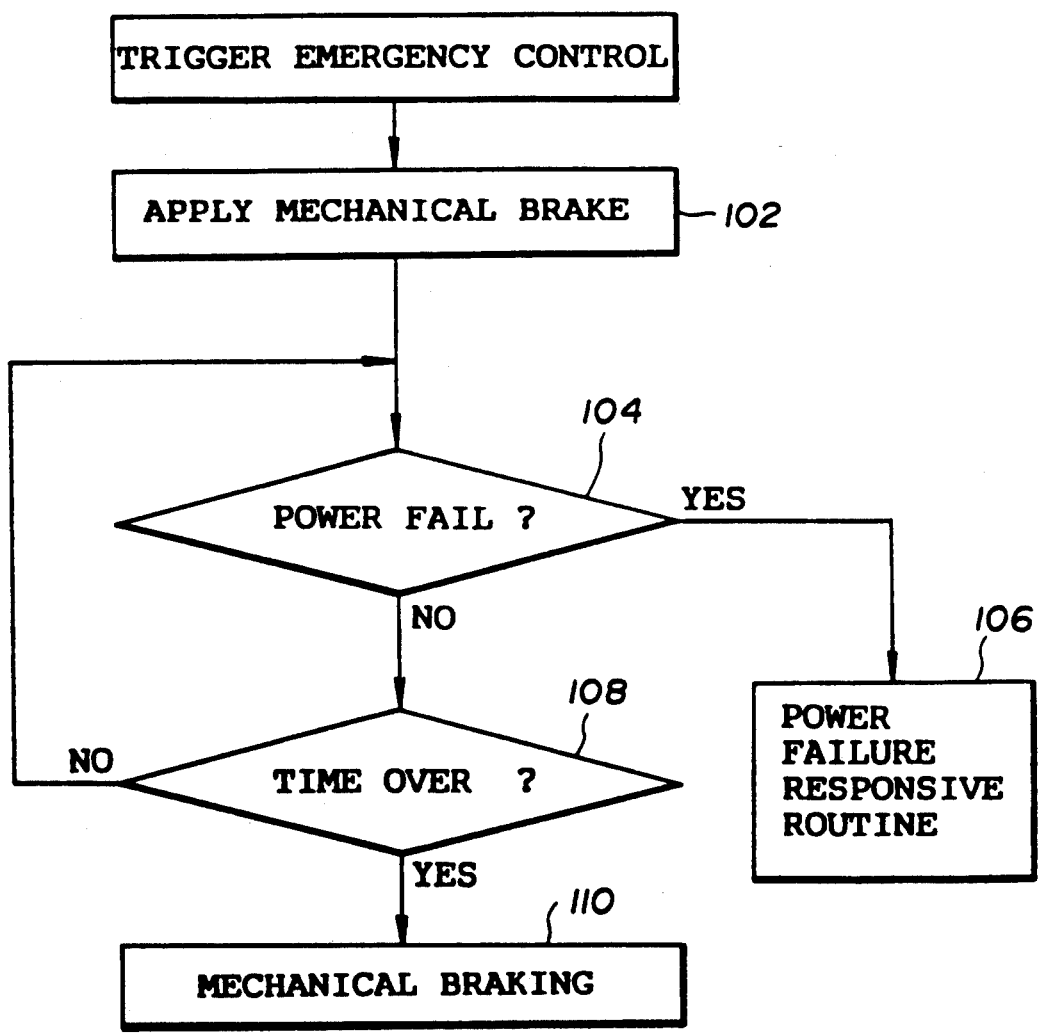
FIG. 3 is a flowchart showing a routine to be triggered in response to excessive voltage or excessive current in a converter circuit of the alternating current motor control system of FIG. 1, for performing emergency control.

In order to avoid this, the preferred embodiment of the induction motor driving system, according to the invention, performs an emergency control operation according to the routine shown in FIG. 3, when abnormality of the power source is detected during regeneration mode operation. As will be appreciated, since the abnormality of the power source 10 is detected by the regenerated current detection circuit 58 or the overvoltage detection circuit 66, the control circuit 50 is responsive to the overcurrent indicative signal OC from the regenerated current detection circuit 58 and/or the overcurrent indicative signal OV from the overvoltage detection circuit 66 during regeneration mode operation of the system, to initiate emergency control operation according to the routine of FIG. 3.

In the preferred embodiment, since the overvoltage at the conductors 22 and 23 reflects overvoltage in the converter circuit 20 and the overcurrent at the conductors 11 and 13 reflects overcurrent in the converter, the emergency control operation is initiated in response to overvoltage or overcurrent in the converter 20.

Figure 2:
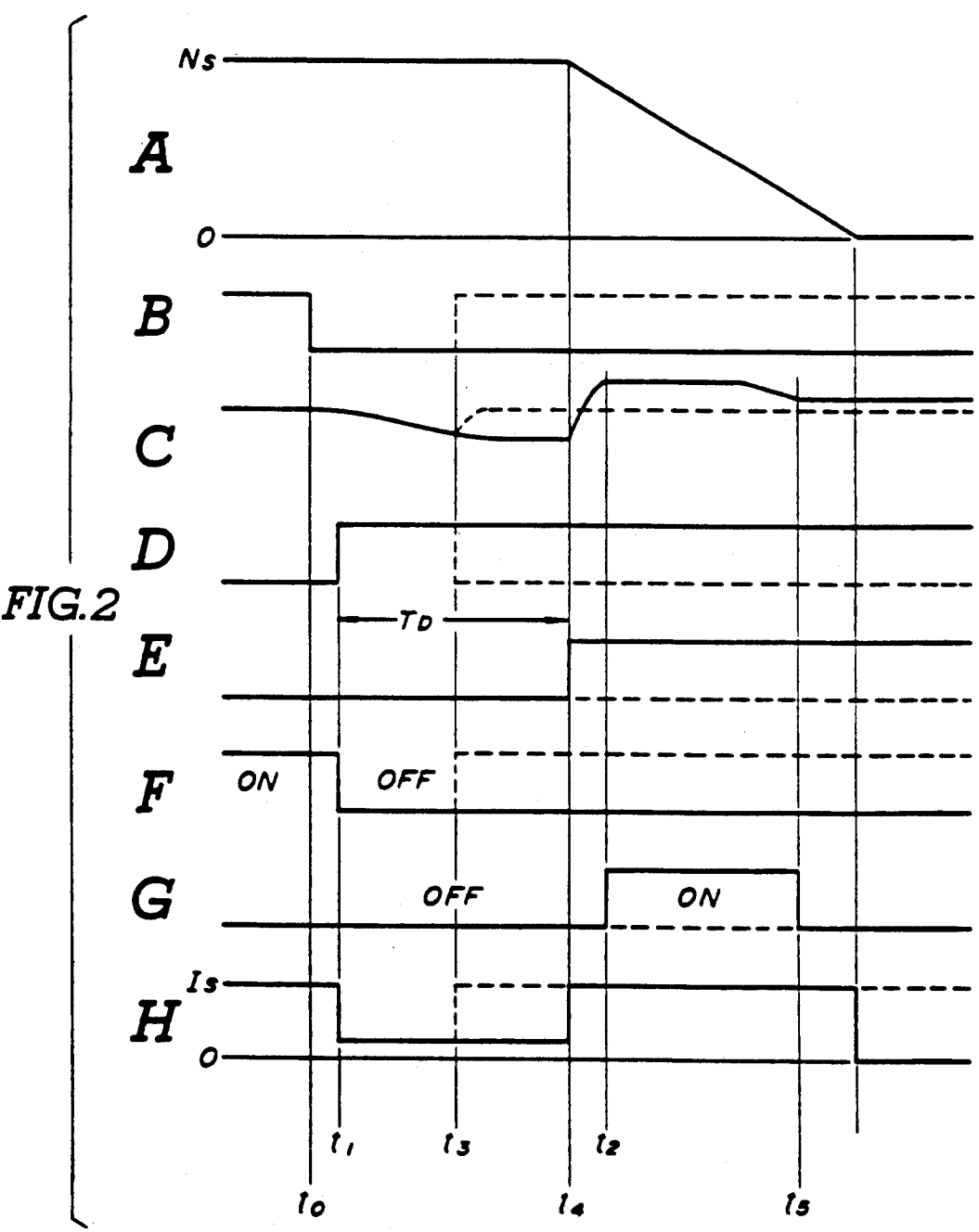
FIGS. 2A to 2H are graphic illustrations used in explaining the operation of the invention.

Immediately after starting the emergency control operation, the mechanical brake is applied to the induction motor 40 or to the elevator cage for deceleration, at step 102. During this mechanical braking deceleration, the signal level of the power failure indicative signal NV is cyclically checked at step 104. When power failure is detected at the step 104, the emergency control in response to the power failure as discussed in connection with the timing chart of FIG. 2 is performed at a step 106.

On the other hand, when power failure is not detected as checked at the step 104, elapsed time is checked at a step 108. When the elapsed time checked at the step 108 is shorter than a given period, the process of the step 104 is performed again. Therefore, within the given period, the steps 104 and 108 are cyclically and repeatedly performed for detecting failure of the power source 10 during deceleration. If failure of the power source 10 is not detected during the given period through the process in the steps 104 and 108, mechanical braking is continued in an active manner and braking force may be increased to stop the induction motor 40, at a step 110.

Through the foregoing process, the abnormality of the power source 10, such as interruption of service, phase open and so forth can always be detected even when the system operates in regeneration mode. Therefore, upon detection of the power failure, power failure responsive emergency control as discussed in connection with the timing chart of FIG. 2 can be performed. This avoids the necessity of emergency stopping of the induction motor in response to abnormality of the power source. Furthermore, by performing the power failure responsive emergency control, synchronous operation of the inverter circuit and the induction motor can be maintained even if the power is temporarily interrupted.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For instance, though the shown embodiment of the induction motor drive control system performs motor speed control in emergency control operations, it may be possible to apply the same idea or process in emergency control for induction motor torque control. In such case, the motor torque control discussed in the co-pending U.S. application Ser. No. 07/314,357 filed on Mar. 13, 1989 and claiming priority from Japanese Application 62-116444 filed on May 13, 1987 and PCT Application PCT/JP88/00459 filed May 13, 1988 with the Japanese Receiving Office entitled "REVOLUTION SPEED CONTROL SYSTEM FOR INDUCTION MOTOR WITH FEATURE OF TEMPERATURE DEPENDENT SPEED CONTROL DEPENDING UPON SECONDARY COIL IN INDUCTION MOTOR", the invention of which may be advantageously applicable. Therefore, the disclosure of the above identified U.S. Patent application is herein incorporated by reference.

Furthermore, though the shown embodiment simply resumes synchronous operation of the induction motor and the inverter upon resumption of the power supply after temporary service interruption, it may be possible to accelerate the motor upon resumption of the service or to temporarily stop the motor and thereafter re-start the motor. In other words, the motor driving pattern upon resumption of the interrupted power can be freely selected.

In addition, when the hoisting direction of the elevator cage, upon detection of abnormality of the power supply, requires driving torque in regeneration mode, it may be possible in emergency control mode to stop the elevator cage at the nearest floor. Furthermore, in a case where a power failure occurs during power mode operation, if the speed of the elevator cage is high and the distance required for safe deceleration is long, the motor driving speed pattern for deceleration and braking torque may be controlled in emergency control mode for stopping the elevator cage at a position where the elevator door can be safely opened and closed.

What is claimed is:

1. A control system supplied by a fixed frequency alternating current (AC) source (10) for controlling an AC machine (40) in a motor mode in which variable frequency AC is supplied thereto and a generator mode in which nonfixed frequency AC is generated therein, comprising:
   first means (20), connected to said fixed frequency AC source, for converting said fixed frequency AC to DC in said power mode and for converting DC to fixed frequency AC for supply to said source in said generator mode;
   second means (30), connected to said first means to receive DC therefrom, in said motor mode, and responsive to a variable speed control signal (50a), for converting said DC to AC of a controlled frequency and amplitude for supply to said AC machine;
   third means (58 or 66) responsive to the level of current or the level of voltage exceeding a predetermined level in said first means in said generator mode for providing a dynamic braking signal for commencing dynamic braking;
   fourth means (35), associated with said AC machine or its load (34), for applying a mechanical brake (35a, 35b) thereto in response to a mechanical braking signal (36); and
   fifth means (50) for providing said variable speed control signal for controlling said second means to drive said motor at an adjustable speed in said motor mode and, in response to a power failure signal at a time $T_0$, for preventing said first means from providing said fixed frequency AC to said source and for reducing the magnitude of said controlled frequency AC to a predetermined minimum limit low enough to maintain a synchronous relationship between said controlled frequency AC and said machine for a selected period ($T_D$) and, after said period elapses, for causing said third means to provide said dynamic braking signal for slowing said machine (for a period from $t_2$ to $t_5$) and thereafter supplying said mechanical braking signal, and, on the other hand, during said generator mode, in response t one of current level and voltage level in said first means exceeding said predetermined level, for providing said braking signal for activating said fourth means at an initial braking torque level and then monitoring (104, 108) said power source for detecting power failure during a timed period while said fourth means being so activated, said fifth means preventing said first means from providing said fixed frequency Ac and for reducing the magnitude of said controlled frequency AC to said predetermined minimum level for said selected period ($T_D$) when power failure is detected while said fourth means being so activated, and, after said timed period expires, otherwise controlling said fourth means for adjusting braking torque of said mechanical brake at a torque level greater than said initial braking torque level for decelerating said motor to stop.

2. An AC machine control system as set forth in claim 1, wherein said third means comprises a current sensor connected between said power source and said first means for monitoring current level of power generated to produce an overcurrent signal in response to said monitored current level exceeding a given current value, and a voltage sensor connected between said first and second means for monitoring voltage of power supplied from said power source to produce an overvoltage signal in response to said monitored voltage exceeding a given voltage value, and wherein said fifth means is responsive to one of said overcurrent or overvoltage signals to commence dynamic braking.

3. An AC machine control system as set forth in claim 1, wherein said fifth means checks said level of current or voltage for a given period of time in which said fourth means is maintained in an active condition for applying said mechanical brake.

4. An AC machine control system as set forth in claim 1, wherein said fifth means restores the magnitude of said controlled frequency AC to its initial value when said power failure continues for said predetermined time.

5. An AC machine control system as set forth in claim 4, wherein said fifth means includes means for controlling said second means to drive said machine at a decelerated speed after said power failure continues for said selected time ($T_8$).

6. An AC machine control system as set forth in claim 1, wherein said first means includes a plurality of switching elements controlled to selectively permit and block flow of current from said second means to said power source during generator mode.

7. A control system for controlling an induction machine which is selectively driven in power mode in which alternating current (AC) power is supplied from an AC source thereto and a regeneration mode in which AC power is regenerated therein, comprising:
a converter connected to the source of AC power for converting the AC power into DC power;
an inverter connected through relatively positive and negative conductors to the converter for inverting the DC power into AC output power having adjustable frequency, voltage magnitude and current magnitude to drive the machine;
the inverter including a rectifier for providing DC in response to the AC power from the machine for regeneration mode;
the converter including regeneration means controlled to permit flow of DC from the rectifier to the AC source during regenerative mode;
an electric resistor connected to a common output of the converter and rectifier, responsive to a dynamic brake signal, for dissipating power caused by a flow of DC therethrough;
a mechanical brake, responsive to a mechanical brake signal, for mechanically braking the machine;
a control circuit for controlling the inverter to drive the machine at an adjustable speed, the control circuit including a first emergency control means responsive to a power failure signal for disabling the regeneration means to prevent flow of AC from the regeneration means to the AC source and reducing the current magnitude of the inverter output AC of a predetermined minimum limit low enough to maintain a synchronous relationship between the inverter and the machine, said first emergency control means for providing the dynamic brake signal for dynamically braking the machine when the power failure signal continues for a predetermined first period and a second emergency control means responsive to at least one of current level and voltage level in the converter exceeding the predetermined level during regeneration mode operation of the control for the machine, for providing the mechanical brake signal for activating the mechanical brake for decelerating the machine, said second emergency control means for monitoring the condition of the power source while the mechanical brake is active, the second emergency control means activating the first emergency control means when a power failure signal is detected while the mechanical brake is held active, and for otherwise providing the braking signal for controlling braking torque of the mechanical brake for decelerating the machine to stop.

8. An induction machine control system as set forth in claim 7, which further comprises a current detector connected between the power source and the regeneration means for monitoring the level of the regenerated AC to produce an overcurrent signal in response to the monitored current level exceeding a given current value, and a DC overvoltage detector connected between the converter and inverter for monitoring voltage of the DC power supplied from the converter to provide an overvoltage signal in response to the monitored DC voltage exceeding a given voltage value, and the second emergency control means of the control circuit for being responsive to one of the overvoltage and overcurrent detector signals to perform emergency control operation.

9. An induction machine control system as set forth in claim 8, wherein the second emergency control means of the control circuit checks the overcurrent and overvoltage signals for a predetermined second period of time in which the mechanical brake is held active for providing the dynamic braking signal after the second period elapses.

10. An induction machine control system as set forth in claim 7, wherein the induction machine is an elevator cage hoisting machine for driving an elevator cage, and the first and second emergency control means while in operation, control the induction machine to stop the elevator cage at a predetermined hoisting position.

11. The controller of claim 8, further comprising:
a capacitor, responsive to said DC power from said first and second rectifier means for smoothing said DC and for storing energy;
means for sensing a failure of said AC source for providing an AC power status (NV) signal indicative thereof;
means responsive to said DC power from said first and second rectifier means for sensing a voltage greater than a selected DC voltage for providing a DC overvoltage (OV) signal;
wherein said control means is responsive to said regulated supply signal for providing said variable frequency drive control signal for controlling said machine at a selected electrical current magnitude, responsive to said AC NV signal for providing said variable frequency drive control signal for controlling said machine at a current less than said selected magnitude and responsive to a conjunction of said AC NV signal and said DC OV signal after said AC NV signal has persisted for a selected period, for providing a dynamic brake control signal; and dynamic brake means, responsive to said dynamic brake control signal, for absorbing energy provided by said machine operating as a generator, thereby slowing its rate of rotation.

12. Apparatus for controlling a rotating machine powered by a fixed frequency alternating current (AC) source, comprising:

first rectifier means, responsive to power provided by said AC source, for providing direct current (DC) to a DC bus;

inverter means, responsive to said DC from said first rectifier means and to a variable frequency drive control signal, for providing variable frequency power for driving said machine as a motor;

second rectifier means, responsive to AC from said machine operating as a generator for providing DC to sad DC bus;

means responsive to said AC source for sensing a power failure of said AC source or of said DC bus for providing an AC power status signal (NV) indicative thereof;

means responsive to said DC bus for providing a DC power status signal (UV);

a capacitor, responsive to said DC bus for smoothing said DC from said first rectifier means and responsive to said DC from said second rectifier means for storing energy provided by said machine operating as a generator;

means responsive to said DC bus for sensing a voltage greater than a selected voltage for providing a DC overvoltage signal (OV);

power supply means, responsive to said DC bus, for providing a regulated power supply signal;

control means, responsive to said regulated supply signal for providing said variable frequency drive control signal for controlling said machine at a selected electrical current magnitude, responsive to both of said power status signals (NV, UV) and having means responsive to a persistence of said DC overvoltage signal for a selected period, for providing a dynamic brake control signal thereafter; and dynamic brake means, responsive to said dynamic brake control signal, for absorbing energy provided by said machine operating as a generator for slowing its rate of rotation.

13. The controller of claim 10, further comprising:

second inverter means, responsive to said DC power from said second inverter means and to a regenerative power control signal, for providing fixed frequency AC to said source wherein said control means is responsive to said regulated supply signal for providing said regenerative power control signal and responsive to said power status signal, for providing said regenerative power control signal except in response to said status signal being indicative of a power failure.

14. An AC machine drive control having a first rectifier for supply by a fixed frequency AC source for providing DC to a first inverter controlled by first switching signals for providing variable frequency AC for operating the machine as a motor for hoisting an elevator at a variable speed and having a second rectifier responsive to AC from the machine during operation thereof as a generator for providing DC to a second inverter controlled by second switching signals for providing the AC source with AC at a fixed voltage and frequency, the control further comprising:

first sensor means, responsive to a failure of said AC source, for providing a first failure signal;

first failure mode means responsive to said first failure signal for preventing said second switching signals from being provided to prevent said second inverter from providing said AC source with fixed voltage and frequency AC from said second inverter for controlling said first switching signals, for limiting the magnitude of the current in said machine to a selected minimum sufficient to maintain synchronism between said limited current and said machine and for providing a first dynamic braking signal after said first failure signal has persisted for a selected period for thereafter initiating dynamic braking;

dynamic braking means, responsive to said first dynamic braking signal and a second dynamic braking signal for absorption of DC from said second rectifier for slowing said machine;

second sensor means, responsive to one of said second inverter providing in excess of a selected AC current or said second rectifier providing in excess of a selected DC voltage, for providing a second failure signal;

a mechanical brake, responsive to a mechanical brake signal for providing a brake force for said elevator or machine;

second failure mode means responsive to said second failure signal for providing said mechanical brake signal for initiating mechanical braking forces on said elevator or machine of insufficient magnitude and for a selected period of insufficient duration to prevent synchronism between AC provided by said first inverter and said machine and subsequently responsive to said first failure signal for providing a second mechanical brake signal for increasing the magnitude or period of duration of said braking force for stopping said elevator or machine but only in the absence of said first failure signal during said selected period and otherwise preventing said second inverter from providing said AC source with fixed voltage and frequency AC from said second inverter.

15. The control of claim 14, wherein said second failure mode means further comprises:

means responsive to said second failure signal and said first failure signal for limiting the magnitude of the current in said machine to said selected minimum sufficient to maintain synchronism between said limited current and said machine.

16. The control of claim 14, wherein said second failure mode means further comprises:

means responsive to said second failure signal and said first failure signal for providing said second dynamic braking signal after said first failure signal has persisted for a selected period for initiating dynamic braking.

17. A failure management method for a variable speed control supplied by a fixed frequency AC source for controlling an AC machine capable of operating in a motoring mode and a regenerative mode, comprising the steps of:

sensing an overvoltage or overcurrent condition and providing an excess power signal;

providing a braking signal in response to the excess power signal;

decelerating the machine in response to the braking signal;

timing the duration of the excess power or braking signal and providing a stop signal after a selected duration; and decelerating the machine with increased force to a stop in response to the stop signal.

18. The method of claim 17, further comprising the steps of:

sensing for a power failure while timing the duration of the excess power or braking signal and providing a failure signal indicative in the presence thereof;

preventing current from being provided by the control to the AC source in response to the failure signal;

controlling current in the machine to a selected magnitude in response to the failure signal;

timing the period of the failure signal and providing a timeout signal after a selected period;

providing dynamic braking of the machine in response to the timeout signal.

19. A variable speed control supplied by a fixed frequency AC source for controlling an AC machine capable of operating in a motoring mode and a regenerative mode, comprising:

means for sensing an overvoltage or overcurrent condition for providing an excess power signal;

means for providing a braking signal in response to the excess power signal;

means for decelerating the machine in response to the braking signal;

means responsive to the excess power or braking signal for timing the duration thereof and for providing a stop signal after a selected duration; and means for decelerating the machine with increased force to a stop in response to the stop signal.

20. The control of claim 17, further comprising:

means responsive to the excess power or braking signal for sensing for a power failure and providing a failure signal in the presence thereof;

means for preventing current from being provided by the control to the AC source in response to the failure signal;

means for controlling current in the machine to a selected magnitude in response to the failure signal;

means for timing the period of the failure signal for providing a timeout signal after a selected period;

means for providing braking of the machine in response to the timeout signal.

* * * * *